United States Patent
Emerson et al.

(10) Patent No.: US 6,487,623 B1
(45) Date of Patent: Nov. 26, 2002

(54) REPLACEMENT, UPGRADE AND/OR ADDITION OF HOT-PLUGGABLE COMPONENTS IN A COMPUTER SYSTEM

(75) Inventors: Theodore F. Emerson, Houston; Vincent Nguyen, Sugarland; Peter Michels, Cypress, all of TX (US); Steve Clohset, Fair Oaks, CA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/303,369

(22) Filed: Apr. 30, 1999

(Under 37 CFR 1.47)

(51) Int. Cl.⁷ ............................................. G06F 13/00
(52) U.S. Cl. ............................ 710/302; 714/7; 714/42
(58) Field of Search ................................ 710/103, 102, 710/104, 301, 302; 714/7, 42, 710

(56) References Cited

U.S. PATENT DOCUMENTS

| | | | |
|---|---|---|---|
| 6,038,680 A | * 3/2000 | Olarig | 714/6 |
| 6,047,343 A | * 4/2000 | Olarig | 710/103 |
| 6,108,732 A | * 8/2000 | Klein | 710/103 |
| 6,141,711 A | * 10/2000 | Shah et al. | 710/103 |
| 6,182,173 B1 | * 1/2001 | Grosser et al. | 710/103 |

* cited by examiner

Primary Examiner—Glenn A. Auve
(74) Attorney, Agent, or Firm—Conley, Rose & Tayon, P.C.

(57) ABSTRACT

A computer system adapted for hot-pluggable components such as memory modules that may be replaced, upgraded and/or added without disturbing normal operation of the computer system. A failing memory module may be replaced by copying its contents to a new memory module in a background operation while the computer system runs its operating system and applications programs. When all contents are copied to the new memory module, the failing memory module may be removed without having to shut down the computer system. Computer system memory may be upgraded or added to by inserting the new memory module(s) into vacant disconnected memory connectors, whereupon the computer system automatically recognizes the new memory module(s), synchronously connects the new memory module(s) to the computer system memory bus, initializes the new memory module(s), and then notifies the operating system that the new memory module(s) is available, all without disturbing normal operation of the computer system.

46 Claims, 4 Drawing Sheets

REPLACEMENT, UPGRADE AND/OR ADDITION OF HOT-PLUGGABLE COMPONENTS IN A COMPUTER SYSTEM

BACKGROUND OF THE INVENTION

1. Field of the Invention

The present invention relates to a computer system having hot-pluggable components such as memory modules, and more particularly, to replacing, upgrading and/or adding the hot-pluggable memory modules without disturbing operation of the computer system.

2. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be used as stand-alone workstations (high end individual personal computers) or linked together in a network by a "network server" which is also a personal computer which may have a few additional features specific to its purpose in the network. The network server may be used to store massive amounts of data, and may facilitate interaction of the individual workstations connected to the network for electronic mail ("e-mail"), document databases, video teleconferencing, whiteboarding, integrated enterprise calendar, virtual engineering design and the like. Multiple network servers may also be interconnected by local area networks ("LAN") and wide area networks ("WAN").

A significant part of the ever increasing popularity of the personal computer, besides its low cost relative to just a few years ago, is its ability to run sophisticated programs and perform many useful and new tasks. The personal computer thus has become an indispensable part of business and the economy. The network server plays an even more critical part in business computing by tying together the personal computer workstations into a network (LAN and WAN), and for storing and/or forwarding critical business information. This business information may comprise for example: databases, word processing, spreadsheets, drawings, graphics, e-mail, graphics, pictures, and the like. Therefore, it is imperative that there be a high availability of the computer system.

Replacement of defective components in a computer system or expanding the capabilities thereof, typically requires shutting down the computer needing service. If a defective component or upgrade is required in a network server, the potential for rendering inoperative all of the personal computers depending on that server is very high. The necessity for high availability of server operation has created hot-pluggable component designs as more fully described in commonly owned U.S. patent application Ser. No. 08/940,419, filed Sep. 30, 1997, entitled "Installation and Removal of Components of a Computer" by Sompong P. Olarig, Kenneth A. Jansen and Paul A. Santeler, and is hereby incorporated by reference. Hot-pluggable component designs, however, have typically required specially designed hardware and software modifications to the operating system software for implementation thereof.

There are some components in a computer system that may become defective but still function for their intended purpose for a period of time. For example, system memory comprising a plurality of random access memory (RAM) devices may have added circuitry for error checking and correction (ECC) which allows memory storage bit errors to be corrected without the data stored therein being corrupted. ECC covers up memory storage bit errors, but it does not fix the RAM device(s) causing the problem. Ultimately, the defective RAM device(s) must be replaced before further degradation, which ECC cannot correct, causes the computer system to become inoperative. Upgrading and/or adding RAM devices without shutting down the computer system is also highly desirable.

What is needed is a system, method and apparatus for replacing failing but functional computer components, upgrading and/or adding components without disturbing the normal operation of the computer system, without requiring specially designed hot-pluggable components, and without installing special operating system software patches.

SUMMARY OF THE INVENTION

The present invention overcomes the above-identified problems as well as other shortcomings and deficiencies of existing technologies by providing in a computer system an apparatus, method and system for replacement of existing faulty components or expansion/addition of components without requiring the computer system to be brought off-line during operation thereof. Component replacement may be performed by logic and firmware within the computer system and requires no software operating system, application programming interface (API) or driver modifications. Industry standard components may be used with the present invention for the hot-pluggable capabilities.

An example of a replacement component is a random access memory (RAM) module that is plugged into a computer system memory connector. Other computer system components are contemplated herein and are within the scope of the invention. Some of these components may be, for example but not limitation: modem, network, video, SCSI, disk drive, and fibre channel interfaces; a processor in a multi-processor system, etc.

An embodiment of the present invention utilizes one or more RAM module connectors or memory connectors which may be electrically isolated from the computer system. Isolation, preferably, is obtained with field effect transistor (FET) signal isolation buffers interposed between the connector signal pins and a memory controller. Power FET switches are interposed between the connector power pins and the computer system power buses. Each isolatable memory connector may also contain one or more software and/or hardware controllable light emitting diodes (LEDs) of various colors (electronically controllable) to indicate the status of the corresponding memory connector. Control and sense logic is implemented to control the operation of the FET signal isolation buffers, power FET switches, LEDs, and memory bus operation between the system memory controller and the isolatable memory connectors. This control and sense logic may monitor ("snoop") memory bus activity so that a memory connector may be brought on or off line only when the memory bus is inactive, i.e., no read or write activities.

When an undesirable number of correctable memory errors occur, the present invention enables on-line replacement of the faulty memory without disturbing the normal operation of the computer system. Correctable memory errors are the most prevalent errors encountered in a computer system having ECC memory. When a particular memory connector having faulty memory is detected, appropriate management traps and alerts are initiated through system software and/or hardware. An indicator LED associated with the faulty memory connector may be activated in such a way as to indicate the condition and location of that connector. In addition, another LED associated with a spare memory connector may indicate that the location of that spare connector has or is available for a replacement memory module. Due to the correctable nature of ECC memory, the faulty memory module will still continue to return correct data to the computer system. Upon inspection of the memory connectors and LEDs associated therewith, an operator or technician can see the status of each memory connector and may determine which connector has the faulty memory module and which memory connector has or can accept a new memory module to replace the faulty one.

The unused memory connector, as indicated by the associated LED, is completely isolated from the computer system memory by a set of FET isolation buffers and the computer system power buses by power FET switches. This unused memory connector either has or can accept insertion of a new memory module without affecting normal operation of the computer system. Upon need and detection of a new memory module in the spare memory connector, an interrupt may be generated to the computer system either by the user pressing an "ok to swap memory" switch, or by some automatic mechanism. This interrupt may be directed to a System Management Mode (SMM) interrupt handler. Upon receipt of this interrupt, SMM code, running above and protected from the operating system software, enables control and detection logic which causes all memory writes that are directed to the faulty memory module to also be directed to the new memory module recently detected and connected to the computer system. Memory system timing may be briefly relaxed to accommodate the increased bus loading of simultaneously addressing and accessing a second memory module.

In order to replace the faulty memory module, the contents of the faulty module must be copied to the replacement memory module. This may be accomplished by system management software (running in SMM) periodically interrupting the operating system software to copy a specified amount of data from the faulty memory module to the replacement memory module, and to enable and disable appropriate hardware to steer the data. Only a small portion of the faulty memory module is copied at a time so that critical operating system tasks are not suspended for too long. The SMM handler periodically invokes transfers of small portions of data from the faulty memory module to the new memory module until all of the data contained in the faulty memory module has been copied to the new memory module, i.e., the contents of the new memory module are fully synchronized with the contents of the old memory module. Then the faulty memory module is taken "off-line" and the new memory module is fully enabled to transact both read and write operations in the computer system. It is contemplated and within the scope of the embodiments of the invention that the contents of the faulty memory module may be transferred to the new memory module by the memory controller, independently of the normal operation of the computer system. The memory controller may synchronize the contents of the faulty and new memory modules when not being addressed by the processor(s) of the computer system (background mode of operation).

This "background process" insures that the entire contents of the faulty memory module are copied to the new "good" memory module. The control logic insures that all writes which may occur during the copying process are written to both the faulty and new memory modules. Consequently, the new replacement memory module will be completely data coherent (synchronized) once the SMM routine is finished copying all of the data from the faulty memory module.

As soon as all of the data in the faulty memory module is copied to the new memory module, the SMM process disables the memory connector containing the faulty memory module through the FET isolation buffers and FET power switch(es) and may use the associated LED to indicate that the copying and isolation processes have finished. The LED may also be used to indicate that the faulty memory module may be safely removed from the computer system without disturbing normal operation thereof. In addition, the control logic now steers all memory reads/writes to the new replacement memory connector and the memory bus timing may be restored to full speed since only one memory module is now being addressed and accessed at a time. In this way, an entire memory module may be replaced without interruption of normal operation of the computer system.

The aforementioned embodiment of the invention also may be automatically performed if a "spare" memory module has been previously installed into a "spare" memory connector. In this case, the present invention may function as a transparent automatic memory fail-over. Upon detection of an undesirable amount of ECC errors from a particular memory module, the aforementioned data replication and isolation procedures may be invoked to copy the data from the failing or faulty memory module to the new memory module. This allows automatic unattended replacement of a faulty memory module(s) for remote and/or critical server applications.

Another embodiment of the invention allows on-line memory expansion. The operating system, however, needs to be notified of the added memory so that it can see and use it. The new memory module may be inserted into a spare memory connector, its presence is detected, tested and initialized then is made available to the operating system.

A combination of replacing a faulty memory module(s) and upgrading memory may also be performed by installing a new memory module having a larger capacity then the faulty module. The data from the faulty module is transferred to the new module, the remaining extra capacity of the new memory module is initialized, and the operating system is informed of the added memory capacity.

Upgrading the capacity of memory in a computer system may be easily performed, according to the present invention. Larger capacity memory module(s) may be installed into "spare" memory connector(s) and the contents of the smaller capacity memory modules functioning in the computer system may be transferred to the new larger capacity memory modules as described above. When all data has been transferred, the lower capacity memory modules may be disabled and removed from the computer system memory connectors and the operating system informed of the increased memory capacity now available. The newly available memory connectors may then be subsequently used for adding or replacing memory modules as described above.

Upgrading or addition of a memory module(s) requires notification to the computer system operating software. This notification may preferably be done by system management software from a remote management console which may be, for example, windows based. It is also contemplated and within the scope of the embodiments of the invention to use hardware switches to designate the additional memory and size thereof.

An advantage of the present invention is that a faulty memory module may be replaced without disturbing the normal operation of the computer system, requiring specially designed memory modules, or modifying the operating system software or drivers.

Another advantage is that additional memory modules may be added to the computer system without having to shut down or disturb the normal operation thereof.

A feature of the present invention is that standard memory modules may be utilized.

Another feature is that standard memory module connectors may be utilized.

Still another feature is that LEDs may be used to indicate the location and status of faulty and/or new memory modules, and the location of an appropriate empty memory connector.

Other and further features and advantages will be apparent from the following description of presently preferred embodiments of the invention, given for the purpose of disclosure and taken in conjunction with the accompanying drawings.

DETAILED DESCRIPTION OF THE PREFERRED EMBODIMENT

The present invention is a system, method and apparatus in a computer for replacing a failing but still functional component with a replacement component, upgrading a failing or functional component, and/or adding a component to the computer system without disturbing the normal operation thereof, without requiring specially designed hot-pluggable components, and without installing special operating system software patches. In an embodiment of the invention, a failing but still functional component may be replaced with a replacement component. In another embodiment, a new component may be installed in the computer. In still another embodiment, a failing but still functional component may be replaced with the replacement component which further adds increased capabilities to the computer (upgrade). Typically, the replacement, new and/or upgrade component will pluggably engage into a connector attached to a printed circuit board in the computer. For illustrative purposes, system random access memory (RAM) will be described for the replacement, new and upgrade components, however, it is contemplated herein and within the scope of the invention that any component in a computer or electronic system may be replaced, according to the invention.

For illustrative purposes, preferred embodiments of the present invention are described hereinafter for computer systems utilizing the Intel x86 microprocessor architecture and certain terms and references will be specific to that processor platform. It will be appreciated by those skilled in the art of computer systems that the present invention may be adapted and applied to any computer platform utilizing replaceable components such as plug-in RAM modules. The plug-in RAM modules may comprise industry standard single-inline-memory modules (SIMM), dual-inline-memory modules (DIMM), and the like.

Referring now to the drawings, the details of preferred embodiments of the present invention are schematically illustrated. Like elements in the drawings will be represented by like numbers, and similar elements will be represented by like numbers with a different lower case letter suffix.

Figure 1:
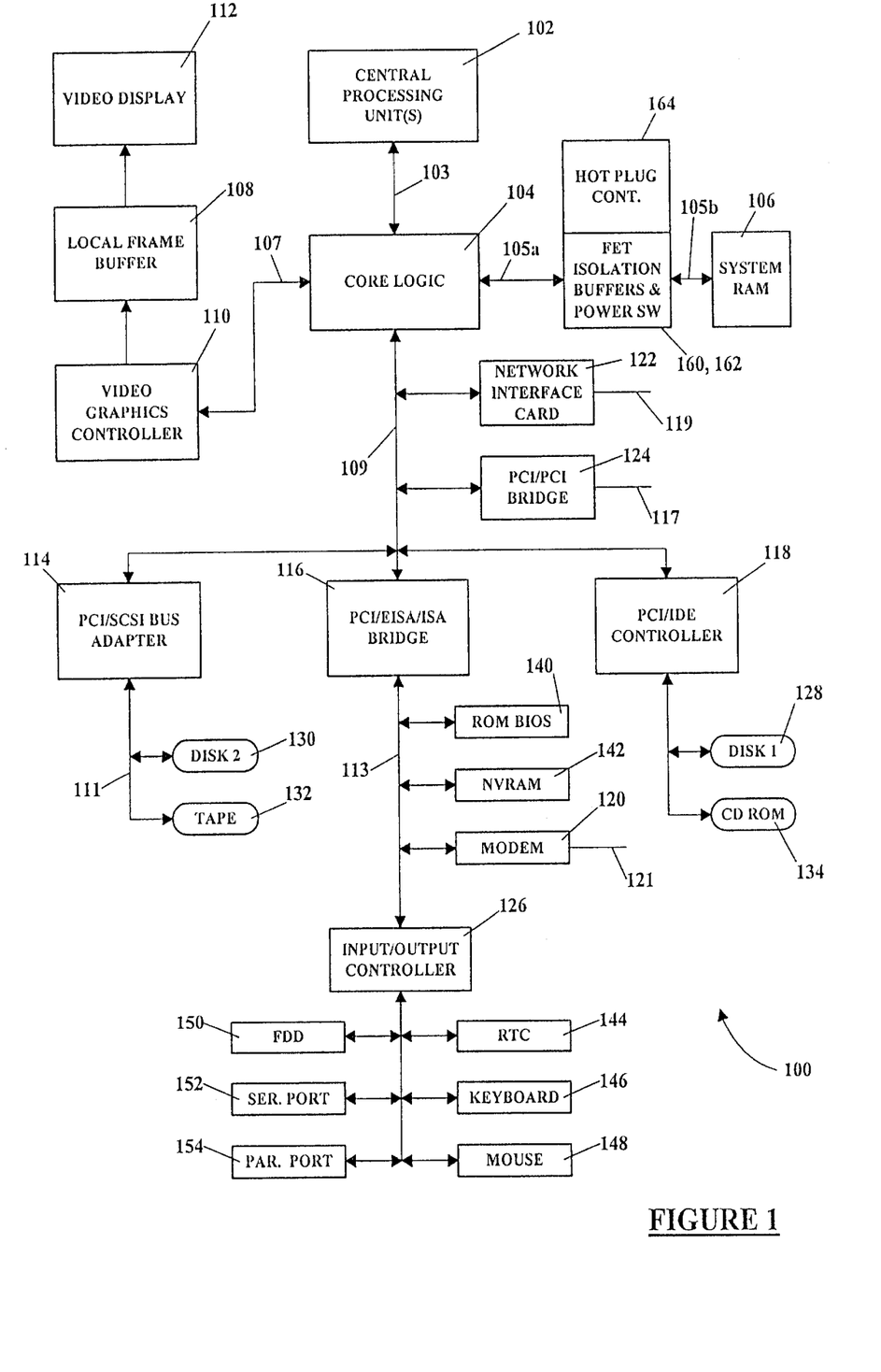
FIG. 1 is a schematic block diagram of a computer system according to the present invention.

Referring now to FIG. 1, a schematic block diagram of a computer system utilizing embodiments of the present invention is illustrated. A computer system is generally indicated by the numeral 100 and comprises a central processing unit(s) (CPU) 102, core logic 104, system random access memory ("RAM") 106, a video graphics controller 110, a local frame buffer 108, a video display 112, a PCI/SCSI bus adapter 114, a PCI/EISA/ISA bridge 116, and a PC/IDE controller 118. Single or multilevel cache memory (not illustrated) may also be included in the computer system 100 according to the current art of microprocessor computer systems. The CPU 102 may be a plurality of CPUs 102 in a symmetric or asymmetric multi-processor configuration. The video graphics controller 110 may be an AGP device (illustrated) connected to an AGP bus 107 or a PCI device (not illustrated) connected to the PCI bus 109.

The CPU(s) 102 is connected to the core logic 104 through a host bus 103. The system RAM 106 is connected to the core logic 104 through a memory bus 105. The video graphics controller 110 is illustrated connected to the core logic 104 through the AGP bus 107. The PCI/SCSI bus adapter 114, PCI/EISA/ISA bridge 116, and PCI/IDE controller 118 are connected to the core logic 104 through a PCI bus 109. Also connected to the PCI bus 109 are a network interface card ("NIC") 122 and a PCI/PCI bridge 124. Some of the PCI devices such as the NIC 122 and PCI/PCI bridge 124 may plug into PCI connectors on the computer system 100 motherboard 300 (see FIG. 3).

Hard disk 130 and tape drive 132 may be connected to the PCI/SCSI bus adapter 114 through a SCSI bus 111. The NIC 122 is connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, a serial port 152, and a parallel port 154. The EISA/ISA bus 113 is a slower information bus than the PCI bus 109, but it costs less to interface with the EISA/ISA bus 113. The PCI/IDE controller 118 interfaces hard disk 128 and CD ROM drive 134 to the PCI bus 109. The system RAM 106 comprises at least one memory module such as, for example but not limitation, a single-in-line memory module (SIMM), dual-in-line memory module (DIMM) and the like. The SIMM or DIMM is adapted to plug into a mating connector located on a printed circuit board of the computer system 100. The printed circuit board may be a motherboard 300 (see FIG. 3) or it may be a "daughter board" (not illustrated) which is connected to the motherboard 300 by, for example, plugging into a daughter board socket on the motherboard 300 or connected thereto by a cable. The daughter board may be, for example, a memory riser card for retrofitting the invention onto an existing computer system motherboard.

In the embodiments of the invention, electronic signal isolation buffers such as field effect transistors (FETs) 160, and power switches such as power FET switches 162 are interposed between each of the hot-pluggable connectors 402 (see FIG. 4), the memory buses 105a and 105b, and the computer system power. Also on the same printed circuit board is a hot-plug controller 164 which comprises control and timing logic used to control the operation of the FET signal isolation buffers 160 and power FET switches 162, and determine when a RAM 106 module is plugged into or removed from its associated connector 402. The hot-plug controller 164 also may determine whether the correct number of RAM 106 modules are plugged into the connectors 402. The hot-plug controller 164 may further be used to control the connection and disconnection of the hot-pluggable connectors 402 (see FIG. 4) from the memory controller 204 (see FIG. 2) in a synchronous fashion, i.e., powering up of the new RAM 106 module with the power FET switches 162 so that the new module circuits become stabilized and initialized, then connecting the new RAM 106 module in the connector 402 with the FET signal isolation buffers 160 to the memory bus 105a only when the memory bus 105a is inactive (no address and/or data being asserted). For the failing RAM 106 module, the memory bus 105a is disconnected during an inactive time by the FET signal isolation buffers 160, and then the power is disconnected from the connector 402 by the power FET switches 162.

The embodiments of the invention may utilize the System Management Interrupt (SMI#) input of the x86 microprocessor 102 to inform the microprocessor 102 that a system management interrupt service routine needs to be performed. This service routine may be stored as firmware in the computer system read only memory basic input output system (ROMBIOS) 140, and an image thereof may be transferred during power-on-self-test (POST) to protected System Management (SM) address space located in the computer system RAM 106. Software may be used to inform external logic (hot-plug control 164) that the processor 102 is in System Management mode (SMM). Once in SMM, the System Management RAM (SMRAM)(part of the RAM 106) may be accessed through the SM address space. The SMRAM contains the program of the embodiments of the present invention which controls operation of the microprocessor. The SMM eliminates special customized software drivers and operating system modifications for operation of the present invention, since the software code of the invention may be executed from a completely separate address space which is transparent to other system software. A more detailed description of the operation of the SMM may be found in the Intel Corporation specifications for the PENTIUM™ and PENTIUM PRO™ (trademarks of Intel Corp.) microprocessors. These specifications are incorporated by reference herein. Other types of microprocessors may have similar operational features and it is contemplated herein and within the scope of the invention that computer systems using other types of microprocessors will similarly benefit from embodiments of the invention.

Figure 2:
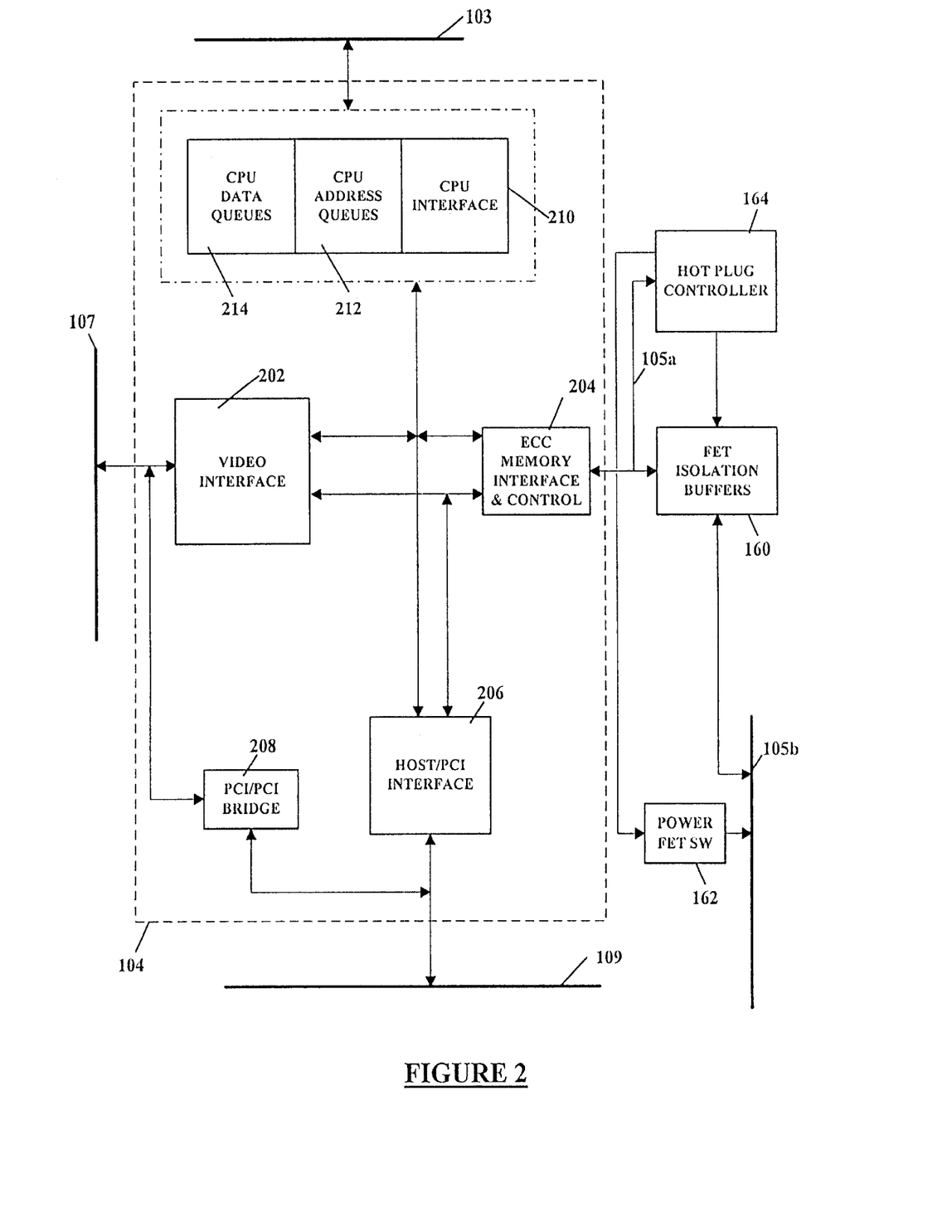
FIG. 2 is a schematic block diagram of a portion of the computer system of FIG. 1.

Referring to FIG. 2 a schematic block diagram of a portion of the computer system of FIG. 1 is illustrated. The core logic 104 comprises an AGP video interface 202, memory interface and control 204, a host/PCI interface 206, a PCI/PCI bridge 208, CPU interface 210, CPU address queues 212, and CPU data queues 214. A hot plug controller 164, and FET signal isolation buffers 160 and power FET switches 162 are interposed between the memory bus 105 and system power, respectively. The hot plug controller 164 may be a separate application specific integrated circuit (ASIC) and used in conjunction with a standard core logic 104 chipset, or it may be part of the core logic 104 chipset.

Figure 4:
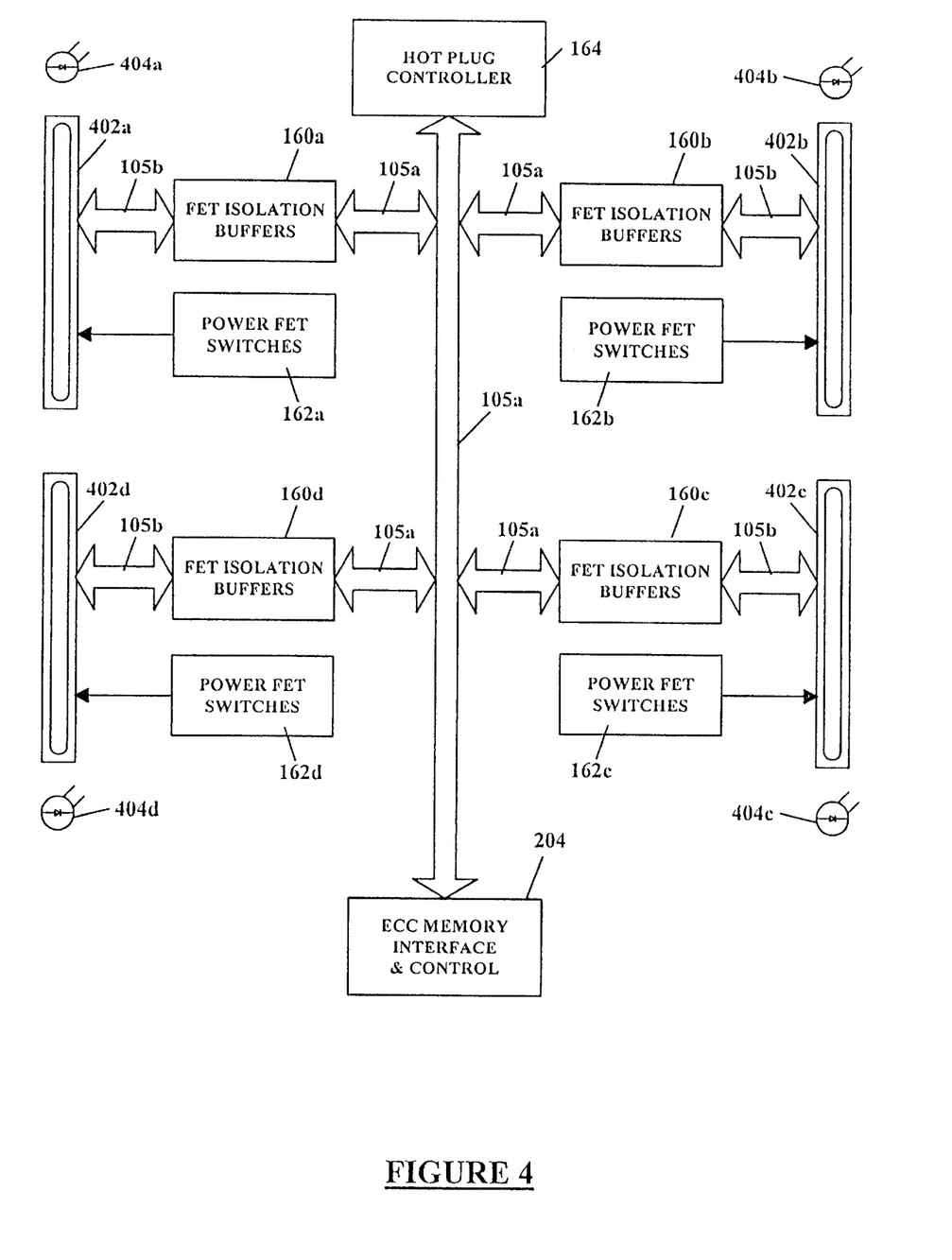
FIG. 4 is a schematic block diagram of an embodiment of the present invention.

The FET signal isolation buffers 160 and power FET switches 162 may be contained in integrated circuit packages that are proximate to the respective RAM connectors 402 (see FIG. 4).

Figure 3:
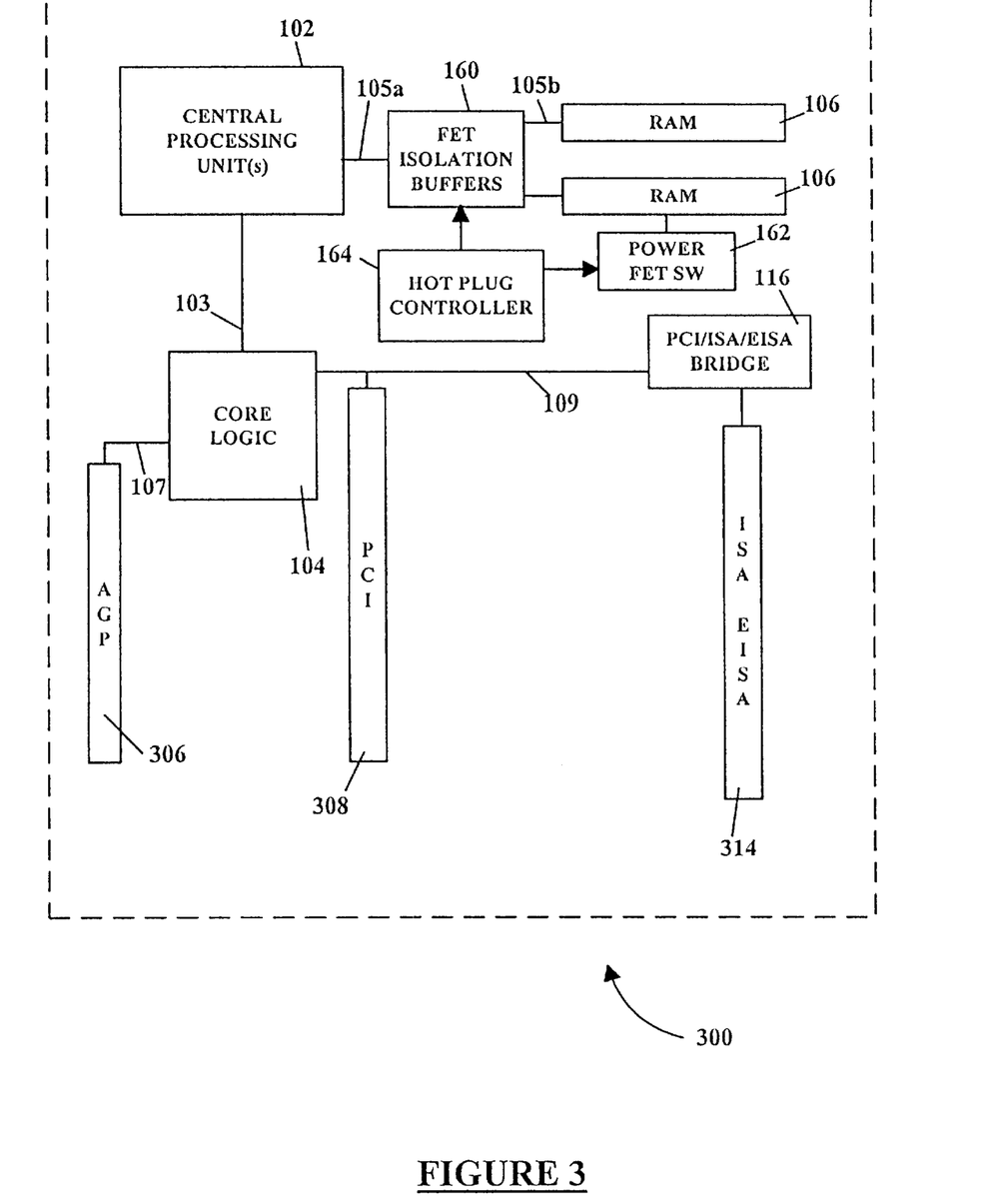
FIG. 3 is a schematic block diagram in plan view of a computer system motherboard with logic components and connectors thereon.

Referring now to FIG. 3, a schematic block diagram in plan view of a computer system motherboard with logic components and connectors thereon is illustrated. The computer system 100 motherboard is represented generally by the numeral 300. The core logic 104 chipset, CPU 102, AGP connector 306, PCI connectors 308, PC/ISA/EISA bridge 116, and ISA/EISA connectors 314 may be located on the motherboard 300. The FET isolation buffers 160, power FET switches 162, hot plug controller 164 and connectors 402 (FIG. 4) for the RAM 106 modules may be located on the motherboard 300, or alternatively, on a daughter board (not illustrated). The RAM 106 connectors are adapted to receive standard SIMM or DIMM.

Referring now to FIG. 4, a schematic block diagram of an embodiment of the present invention is illustrated. For illustrative clarity, only the connectors and circuits for four RAM 106 modules are illustrated. Any number of connectors and circuits for any number of RAM 106 modules are contemplated herein and within the scope of the present invention. SIMM or DIMM connectors 402 are connected to the FET isolation buffers 160 which connect to the memory controller bus 105a. The hot-plug controller 164 controls the operation of the FET signal isolation buffers 160 and power FET switches 162, as more fully described hereinafter.

In an embodiment of the invention, a plurality of SIMM or DIMM connectors 402, either on the motherboard 300 or daughter board (not illustrated), are connected through FET signal isolation buffers 160 to the memory controller address, control and data bus 105a, and to the computer system power bus (not illustrated) through power FET switches 162. Light emitting diode (LED) 404 indicators may be strategically located next to their associated connectors 402 for indication of status and operation thereof, and any RAM 106 module plugged therein. Control logic (hot plug controller 164) for controlling the FET signal isolation buffers 160 and power FET switches 162, and detecting the presence of a RAM SIMM or DIMM (RAM 106 module) in any of the plurality of connectors 402 may also be located on the same board as the plurality of connectors 402, LEDs 404, and the FET signal isolation buffers 160 and power FET switches 162. The hot-plug controller 164 may control the LEDs 404, and may also have circuits for snooping the memory bus 105a for memory read and write activities.

Replacement of a Failing Component

At least one RAM 106 module is operating in the computer system 100. Typically, system management software, running under the operating system software, determines whether a RAM 106 module is failing. Logic in the ECC memory controller 204 will assert a single bit correctable error (SBCE#) signal when a correctable memory error is detected for a RAM 106 module. The SBCE# signal typically is routed to a computer system interrupt request signal, such as for example IRQ13, which invokes appropriate interrupt handlers in the computer system management software. This computer system management software determines whether the RAM 106 module is indeed faulty. When the RAM 106 module is so determined to be faulty, the computer system management software will identify the connector 402 in which the faulty RAM 106 module is located and set an appropriate status bit in a connector status register (not illustrated) associated with that connector 402.

It is contemplated and within the scope of the present invention that the RAM 106 module replacement process may be controlled entirely with SMI firmware, however, the detection of a failing memory module is preferably done by system management software using error detection algorithms based on memory error count over a certain time period. Once the failing module is detected, the system management software signals to SMI that a particular module needs to be replaced. If a spare RAM 106 module is already present in a connector 402, a replacement operation may begin immediately. If a spare RAM 106 module is not present in a connector 402, then an operator or technician may be alerted of the RAM 106 module memory error problem and the following steps may be performed:

1. A new RAM 106 module is inserted into an empty connector 402.
2. The hot-plug controller 164 detects the presence of the new RAM 106 module and applies an algorithm to determine when the RAM 106 module is seated in the connector 402 and the electrical connections are stable.
3. The hot-plug controller 164 signals an alert (interrupt) to the SMI of the presence of the new RAM 106.
4. SMI determines that the new RAM 106 module is an "insertion" event and also determines which one of the connectors 402 the RAM 106 module is inserted in by reading, for example, a status register associated with the one of the connectors 402.
5. The SMI may write to a control register (not illustrated) which causes the hot-plug controller 164 to turn on a power FET switch(es) 162 which then applies power to the RAM 106 module which stabilizes its circuitry before connection to the memory bus 105*a*.
6. The SMI then signals that the new RAM 106 module should be connected to the memory bus 105 by, for example, writing to a control register of the hot-plug controller 164.
7. The hot-plug controller 164 detects when the memory bus 105 is idle and then causes the FET signal isolation buffers 160 to connect the signal pins of the connector 402 to the memory bus 105*a*.
8. The SMI configures the starting address location of the new RAM 106 and enables write operations thereto by writing the starting address and write enable information to another control register.

A period of time may be imposed between steps 2 and 3 above to ensure that the new RAM 106 module has been properly seated and electrically connected to the connector 402. If the connection of the RAM 106 module is disturbed in its connector 402, the period of time is reset and the wait starts over. The hot-plug controller 164 may also determine if the correct number of RAM 106 modules have been installed when multiple modules are required for interleaved memory operation. The embodiments of the invention may also relax the timing requirements of the memory bus 105 since two RAM 106 modules will be activated (causing twice the loading of the bus) thereon during transfer of information from the failing RAM 106 module to the new RAM 106 module.

A feature of the embodiments of the invention is transferring or synchronizing all information contained in the failing RAM 106 module to the new RAM 106 module without disturbing the normal operation of the computer system 100. The embodiments of the invention do this transferring and synchronizing of information by enabling writes to both the failing RAM 106 module and the new RAM 106 module, and reads from only the failing RAM 106 module during the time required to synchronize the failing and new RAM 106 modules. Both the failing and new RAM 106 modules respond to the same addresses and are thus activated concurrently. The SMM program running in SMI causes the processor 102 to execute read-modify-write operations on the contents of the failing RAM 106 module. The read-modify-write operation is used because the processor 102 treats this operation as a locked or un-interruptible operation. The data contained in the failing RAM 106 module is not modified, thus the embodiment of the invention merely performs a locked READ/WRITE operation. Since the failing and new RAM 106 modules respond to the same addresses, and both are written to concurrently (but only the failing RAM 106 module can be read from during the transfer operation), the new RAM 106 module is updated to the contents of the failing RAM 106 module. The SMM program causes the processor 102 to execute read-modify-writes of all address locations in the failing RAM 106 module until the entire contents of the failing RAM 106 module have been addressed.

The SMM program runs the read-modify-writes in the background and only executes for a small percentage of the operating time of the other programs running in the computer system. Thus, access to the computer system 100 by the other programs is not materially affected even though the overall operation of the computer system 100 may slow down slightly due to the increased activity on the memory bus 105. The read-modify-write operation is utilized because this operation locks out other bus masters (PCI, AGP, etc.) from accessing the memory bus 105 before the read-modify-write operation has completed. If another bus master writes to the failing RAM 106 module between the portions of the SMM read-modify-write operations to the failing and new RAM 106 modules, the new RAM 106 module will also be written to, thus maintaining data coherency and synchronization between these two RAM 106 modules. Once the read-modify-write transfers of all of the contents of the failing RAM 106 module have been completed, the hot-plug controller 164 disconnects the failing RAM 106 module from the memory bus 105 and system power by means of the FET signal isolation buffers 160 and power FET switches 162 when the memory bus 105 is inactive, and then enables read accesses to the new RAM 106 module so that the next memory read access is serviced by only the new RAM 106 module. Once the failing RAM 106 module has been isolated from the memory bus 105*a* by the FET signal isolation buffers 160, and from the power bus by the power FET switches 162, the failing RAM 106 module may be easily and safely removed from its connector 402 without disturbing normal operation of the computer system 100. Removing the failing RAM 106 module from the memory connector 402 makes this connector 402 available for adding another new RAM 106 module for further replacement or addition of RAM 106 in the computer system 100.

Adding a New Component

A new component such as a new RAM 106 module(s) may be added to the computer system 100 without shutting it down. This embodiment of the invention allows the capacity of the RAM 106 to be dynamically increased while the computer system 100 remains operational. This is especially important in critical server applications that must function on a 7 day by 24 hour schedule. For example, the critical server has an application(s) which is starting to slow down because of insufficient RAM 106 size to properly handle the requirements of the application. Normally, the server would have to be scheduled for a shutdown, new RAM 106 installed, then the server brought back up to a fully operational state.

According to this embodiment of the invention, a technician may insert the new RAM 106 module(s) into an empty connector(s) 402 and circuitry in the hot-plug controller 164 detects the presence of this new RAM 106 module by, for example but not limitation, the RAM 106 module grounding a signal connection in the connector 402. Once the presence of a RAM 106 module is detected, the hot-plug controller 164 may wait a period of time, for example five seconds, before generating an SMI. The SMI routine reads a status register and identifies what RAM 106 module(s) has been installed in which previously empty connector(s) 402. The SMI routine causes the hot-plug controller 164 to apply power to the connector 402 with the power FET switches 162. This allows the new RAM 106 module to stabilize and initialize its circuits before they are connected to the memory bus 105a by the FET signal isolation buffers 160.

After the hot-plug controller 164 synchronously connects the connector 402 having the new RAM 106 module to the memory bus 105a as described above, the SMI routine identifies the new memory and determines its size (capacity). Next, the SMI routine instructs the hot-plug controller 164 to configure the new RAM 106 module(s) for a unique area of RAM 106 address space, preferably above the address space of the current RAM 106. The starting address for the new RAM 106 module(s) may be stored in the associated register as mentioned above (not illustrated). Then the SMI routine begins a background routine which may first test and then initializes (writes 0's to) the new RAM 106 module(s). Once this initialization process is complete, the SMI routine generates an interrupt to the software operating system to inform it of the added system RAM 106. The software operating system responds to this interrupt, retrieves status information of the newly added RAM 106 through a predetermined mechanism (e.g., Advanced Configuration Power Interface "ACPI"), and then utilizes the added RAM 106 according to the specific operating system environment.

Upgrading a Component

Upgrading of an existing component, whether defective or not, is similar to what was disclosed hereinabove for replacement of a failing component and adding a new component. For example, upgrading the RAM 106 for greater capacity generally requires the addition to and/or replacement of existing RAM 106 modules. The existing RAM 106 modules are not necessarily failing though a replacement and upgrade could be performed concurrently since the basic requirements for an upgrade/replacement are the same as those of replacing a failing component.

According to the upgrade embodiment of the invention, a technician may insert the new RAM 106 module(s) into an empty connector(s) 402 and circuitry in the hot-plug controller 164 detects the presence of this new RAM 106 module as described hereinabove. Once the presence of a RAM 106 module is detected, the hot-plug controller 164 may wait a period of time, for example five seconds, before generating an SMI. The SMI routine reads a status register and identifies what RAM 106 module(s) has been installed in which previously empty connector(s) 402. The SMI routine causes the hot-plug controller 164 to apply power to the connector 402 with the power FET switches 162. This allows the new RAM 106 module to stabilize and initialize its circuits before they are connected to the memory bus 105a by the FET signal isolation buffers 160.

After the hot-plug controller 164 synchronously connects the connector 402 having the new RAM 106 module to the memory bus 105a as described hereinabove, the SMI routine identifies the new memory and determines its size (capacity). Since the new RAM 106 module is replacing an existing RAM 106 module, the existing RAM 106 module beginning address space will also be the beginning address space for the new RAM 106 module. The new RAM 106 module will typically have a larger storage capacity than the RAM 106 module it is replacing. Thus, a new address space must be defined by the operating system software as described hereinabove.

Data from the present RAM 106 module must be synchronized with the new RAM 106 module. The data stored in the present RAM 106 module must be transferred in a background mode to the new RAM 106 module as described hereinabove for replacing a failing component. Once all of the data from the present RAM 106 module has been written to the new RAM 106 module, the hot-plug controller 164 will synchronously disconnect the appropriate connector 402 from the memory bus 105a with the FET signal isolation buffers 160, and then disconnect system power from this connector 402 with the power FET switches 162. The hot-plug controller 164 will also enable the new RAM 106 module to respond to read request. The memory capacity which is in excess of the memory capacity of the RAM 106 module being replaced, needs to be initialized by writing all zeros to any memory locations not mapped from the RAM 106 module being replaced. After the synchronization and initialization process has been completed, the technician can remove the disabled RAM 106 module(s), thus freeing up more connectors 402 for adding more new RAM 106 modules in the future.

The added capacity of the upgrade RAM 106 module may be made known to the operating system software by, for example, a windows application showing a menu of selectable upgrade options. This windows application would notify the SMI through an API, allowing the SMI firmware to perform the upgrade when the new RAM 106 was available. The SMI routine may configure the new RAM 106 module(s) for the same starting address as the RAM 106 module(s) being replaced, and the SMI routine also alerts the software operating system that additional memory capacity is available in the computer system 100. Once notified, the operating system software may allocate the additional address space to application processes.

The hot-plug controller 164 may have registers (not illustrated) associated with each connector 402 which may be used to store the status of the connectors 402 and any RAM 106 module inserted therein. For example, status bits in the registers may indicate a connector with no RAM 106 module, a fully operational RAM 106 module, a failing RAM 106 module, a standby non-operational RAM 106 module, a new un-initialized or un-synchronized RAM 106 module located in the connector, etc. Some of these registers may contain the starting address of the address block in which the associated RAM 106 module will operate, etc. Status bits in these registers may also be used to control the status indications represented by the LEDs 404.

The LEDs 404 may be utilized to indicate the status of an associated memory connector 402 and/or RAM 106 module plugged therein. Each memory connector 402 may have one or more LEDs 404 associated therewith. One LED 404 having multiple colors may be used for each connector 402, or a plurality of LEDs 404, each having a different color, may also be used. Combinations of colors and on-off flash or blink rates may be utilized to convey visual information of the status of each memory connector 402. For example:

When a memory connector 402 is empty, or a RAM 106 module is plugged therein but the connector 402 is disconnected from the memory bus 105 and power, the associated LED 404 is off (dark).

A failed and uncorrectable RAM 106 module, the associated LED 404 is steady red.

An operational but failing RAM 106 module having correctable errors detected, the associated LED 404 is steady amber.

Any fully functional RAM 106 module that is not failing, the associated LED 404 is steady green.

During hot-add of a new RAM 106 module, the associated LED 404 is blinking amber to indicate that this new module has not been fully initialized.

During hot-replacement of an operational but failing RAM 106 module with a new RAM 106 module, both failing and new modules are identified by blinking amber LEDs 404. A preferred blink pattern may be BAD-NEW-PAUSE, BAD-NEW-PAUSE, etc., to indicate which module is being copied from (failing) and which is being copied to (new). The nature of the blink pattern indicates the direction of data being copied.

Other combinations of colors and blink rates may be utilized and it is contemplated herein and within the scope of the invention that any color of light and/or blink rates from the LEDs 404 may be utilized to indicate the different states of the RAM 106 modules and memory connectors 402.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system having hot-pluggable components, said system comprising:
    a central processing unit;
    a component controller connected to said central processing unit;
    a component bus connected to said component controller;
    a plurality of component connectors adapted to receive component modules;
    a plurality of component bus switches connected between said component bus and said plurality of component connectors;
    a plurality of component power switches connected between said plurality of component connectors and a power source;
    a first component module installed in a one of said plurality of component connectors; and
    a logic circuit connected to said component bus, said plurality of component connectors, said plurality of component bus switches and said plurality of component power switches, wherein
        when said component controller determines that said first component module is failing but still operational, said component controller asserts a system management interrupt to said central processing unit;
        when said central processing unit receives the system management interrupt, said central processing unit runs a system management program which determines whether a second component module is installed in another one of said plurality of component connectors;
        if said second component module is not installed then the system management program continues determining until said second component module is installed;
        if said second component module is installed then the system management program causes said central processing unit to transfer information stored in said first component module to said second component module until all information is transferred, the transfer of information is done as a background operation which does not materially affect other programs running in said central processing unit;
        said logic circuit causing some of said plurality of component bus switches to disconnect said first component module from said component bus after all of the information is transferred; and
        said logic circuit causing some of said plurality of component power switches to disconnect said first component module from said power source after the some of said plurality of component bus switches has disconnected said first component module from said component bus.

2. The computer system of claim 1, further including a plurality of central processing units.

3. The computer system of claim 1, wherein said plurality of component bus switches comprise a plurality of field effect transistor switches.

4. The computer system of claim 1, wherein said plurality of component power switches comprise a plurality of field effect transistor power switches.

5. The computer system of claim 1, wherein said first and second component modules are selected from the group consisting of a random access memory, a network interface, a modem, a disk interface, a peripheral component interconnect (PCI) interface, an accelerated graphics port (AGP) interface, a co-processor, a universal serial bus (USB) interface, a fibre channel interface, an industry standard architecture (ISA) controller, an extension to industry standard architecture (EISA) controller, a super input-output (SIO) controller, and a small computer system interface (SCSI).

6. The computer system of claim 1, wherein said first and second component modules are first and second random access memory (RAM) modules, respectively, said component controller is a memory controller having error checking and correcting logic, and said first component module is failing with correctable bit errors.

7. The computer system of claim 6, further comprising:
    said second RAM module having a larger storage capacity than said first RAM module;
    the system management program initializes a portion of said second RAM module which is not written to during transfer of the information from said first RAM module; and
    the system management program generates an interrupt to an operating system program to inform the operating system program of the additional memory capacity available from said second RAM module.

8. The computer system of claim 1, further comprising detection logic for determining when a component module is installed in and removed from a one of said plurality of component connectors.

9. The computer system of claim 8, wherein said detection logic determines when said component module is installed in and removed from the one of said plurality of component connectors by sensing an electrical connection to said component module and sensing a loss of the electrical connection to said component module, respectively.

10. The computer system of claim 8, wherein said detection logic waits a specified time before connecting said component module to said power source and then to said component bus after determining when said component module is installed in the one of said plurality of component connectors.

11. The computer system of claim 10, wherein said detection logic resets and does not connect said component module if it senses during the specified time that said component module is not installed.

12. The computer system of claim 1, further comprising a plurality of light emitting diodes associated with said plurality of component connectors, each one of said plurality of light emitting diodes indicating status of an associated one of said plurality of component connectors.

13. The computer system of claim 12, wherein a steady red indication from said one of said plurality of light emitting diodes represents a failed one of said component modules located in said associated one of said plurality of component connectors.

14. The computer system of claim 12, wherein a steady green indication from said one of said plurality of light emitting diodes represents a fully functional one of said component modules located in said associated one of said plurality of component connectors.

15. The computer system of claim 12, wherein no indication from said one of said plurality of light emitting diodes represents a disconnected one of said plurality of component connectors.

16. The computer system of claim 12, wherein a steady amber indication from said one of said plurality of light emitting diodes represents a failing but operational one of said component modules located in said associated one of said plurality of component connectors.

17. The computer system of claim 12, wherein a blinking amber indication from said one of said plurality of light emitting diodes represents a one of said component modules located in said associated one of said plurality of component connectors being initialized with information from another one of said component modules.

18. The computer system of claims 12, wherein a first one of said plurality of light emitting diodes associated with said first component module and a second one of said plurality of light emitting diodes associated with said second component module alternately blink with amber indications and a pause to represent transfer of information and the direction thereof.

19. The computer system of claim 1, further comprising the system management software sending an alert to an operator when said first component module is failing and said second component module is not installed.

20. The computer system of claim 1, wherein:
if a second component module is not installed and then is subsequently installed in said another one of said plurality of component connectors, then
said logic circuit causes some other of said plurality of component power switches to connect said second component module to said power source; and
said logic circuit causes some other of said plurality of component bus switches to connect said second component module to said component bus when said component bus is inactive; and
said first and second component modules writing the information to the same addresses, but only the first component module responding to a read request during transfer of the information.

21. A computer system having hot-pluggable components, said system comprising:
a central processing unit;
a component controller connected to said central processing unit;
a component bus connected to said component controller;
a plurality of component connectors adapted to receive component modules;
a plurality of component bus switches connected between said component bus and said plurality of component connectors;
a plurality of component power switches connected between said plurality of component connectors and a power source;
a new component module installed in a one of said plurality of component connectors; and
a logic circuit connected to said component bus, said plurality of component connectors, said plurality of component bus switches and said plurality of component power switches, wherein
when said logic circuit determines that said new component module is installed in the one of said plurality of component connectors, said logic circuit causes some of said plurality of power switches to connect the one of said plurality of component connectors to said power source, and then said logic circuit causes some of said component bus switches to connect the one of said plurality of component connectors to said component bus when said component bus is inactive;
said logic circuit asserting a system management interrupt to said central processing unit after the one of said plurality of component connectors is connected to said power source and said component bus; and
when said central processing unit receives the system management interrupt, said central processing unit runs a system management program for initializing said new component module and then the system management program notifies an operating system program of the availability of said new component module.

22. The computer system of claim 21, further including a plurality of new component modules.

23. The computer system of claim 21, wherein said new component module is selected from the group consisting of a random access memory, a network interface, a modem, a disk interface, a peripheral component interconnect (PCI) interface, an accelerated graphics port (AGP) interface, a co-processor, a universal serial bus (USB) interface, a fibre channel interface, an industry standard architecture (ISA) controller, an extension to industry standard architecture (EISA) controller, a super input-output (SIO) controller, and a small computer system interface (SCSI).

24. The computer system of claim 21, wherein said new component module is a new random access memory (RAM) module, said component controller is a memory controller having error checking and correcting logic, and said component bus is a computer system memory bus.

25. The computer system of claim 24, further comprising detection logic for determining when said new RAM module is installed in and removed from the one of said plurality of component connectors.

26. The computer system of claim 25, wherein said detection logic waits a specified time before connecting said new RAM module to said power source and then to said computer system memory bus after determining when said new RAM module is installed in the one of said plurality of component connectors.

27. The computer system of claim 25, wherein said detection logic determines when said new RAM module is installed in and removed from the one of said plurality of component connectors by sensing an electrical connection to said new RAM module and sensing a loss of the electrical connection to said new RAM module, respectively.

28. The computer system of claim 24, wherein the system management program initializes said new RAM module by writing zero values to all address locations thereof.

29. The computer system of claim 24, wherein the system management program determines the size of said new RAM module.

30. The computer system of claim 24, wherein the system management program determines what address space is assigned to said new RAM module.

31. The computer system of claim 24, wherein the system management program generates an interrupt to an operating system program to inform the operating system program that said new RAM module is available for use.

32. The computer system of claim 31, wherein the operating system program responds to the interrupt, retrieves status information of said new RAM module and then utilizes said new RAM module when running programs in the computer system.

33. The computer system of claim 31, wherein the operating system program uses an advanced Configuration Power Interface (ACPI) for retrieving the status information.

34. A method, in a computer system comprising a central processing unit, a component controller connected to the central processing unit, a component bus connected to the component controller, a plurality of component connectors adapted to receive component modules, a plurality of component bus switches connected between the component bus and the plurality of component connectors; a plurality of component power switches connected between the plurality of component connectors and a power source; and a logic circuit connected to the component bus, the plurality of component connectors, the plurality of component bus switches and the plurality of component power switches; said method comprising the steps of:
   providing a first component module installed in a one of the plurality of component connectors;
   detecting a failing but still operational first component module;
   alerting an operator when the first component module is determined to be failing;
   determining whether a second component module is installed in another one of the plurality of component connectors and is available to replace the failing first component module;
      if the second component module is installed and available in the another one of the plurality of component connectors, then
         connecting the power source to the another one of the plurality of component connectors with some of the plurality of component power switches; and
         connecting the component bus to the another one of the plurality of component connectors with some of the plurality of component bus switches when the component bus is not active;
   transferring information from the failing first component module to the second component module until all information has been transferred; and
   disconnecting the first component module from the component bus after the information has been transferred.

35. The method of claim 34, further comprising the step of waiting a predetermined time after detecting the second module being installed in the another one of the plurality of component connectors before connecting the another one of the plurality of component connectors to the power source and then the component bus.

36. The method of claim 34, further comprising the step of indicating status of the first component module with a light emitting diode located proximate to the one of the plurality of component connectors.

37. The method of claim 34, further comprising the step of indicating status of the second component module with a light emitting diode located proximate to the another one of the plurality of component connectors.

38. The method of claim 34, wherein the step of transferring information from the failing first component module to the second component module is done by the component controller.

39. A method, in a computer system comprising a central processing unit, a component controller connected to the central processing unit, a component bus connected to the component controller, a plurality of component connectors adapted to receive component modules, a plurality of component bus switches connected between the component bus and the plurality of component connectors; a plurality of component power switches connected between the plurality of component connectors and a power source; and a logic circuit connected to the component bus, the plurality of component connectors, the plurality of component bus switches and the plurality of component power switches; said method comprising the steps of:
   providing a first component module installed in a one of the plurality of component connectors;
   detecting a failing but still operational first component module;
   determining whether a second component module is installed in another one of the plurality of component connectors and is available to replace the failing first component module;
   alerting an operator if the second component module is not available;
      if the second component module is installed and available in the another one of the plurality of component connectors, then
         connecting the power source to the another one of the plurality of component connectors with some of the plurality of component power switches; and
         connecting the component bus to the another one of the plurality of component connectors with some of the plurality of component bus switches when the component bus is not active;
   transferring information from the failing first component module to the second component module until all information has been transferred; and
   disconnecting the first component module from the component bus after the information has been transferred.

40. A method, in a computer system comprising a central processing unit, a component controller connected to the central processing unit, a component bus connected to the component controller, a plurality of component connectors adapted to receive component modules, a plurality of component bus switches connected between the component bus and the plurality of component connectors; a plurality of component power switches connected between the plurality of component connectors and a power source; and a logic circuit connected to the component bus, the plurality of component connectors, the plurality of component bus switches and the plurality of component power switches; said method comprising the steps of:

provided a first component module installed in a one of the plurality of component connectors;

detecting a failing but still operational first component module;

determining whether a second component module is installed in another one of the plurality of component connectors and is available to replace the failing first component module;

alerting the operator when the second component module is not installed;

if the second component module is installed and available in the another one of the plurality of component connectors, then connecting the power source to the another one of the plurality of component connectors with some of the plurality of component power switches; and connecting the component bus to the another one of the plurality of component connectors with some of the plurality of component bus switches when the component bus is not active;

transferring information from the failing first component module to the second component module until all information has been transferred; and disconnecting the first component module from the component bus after the information has been transferred.

41. A method, in a computer system comprising a central processing unit, a component controller connected to the central processing unit, a component bus connected to the component controller, a plurality of component connectors adapted to receive component modules, a plurality of component bus switches connected between the component bus and the plurality of component connectors; a plurality of component power switches connected between the plurality of component connectors and a power source; and a logic circuit connected to the component bus, the plurality of component connectors, the plurality of component bus switches and the plurality of component power switches; said method comprising the steps of:

providing a first component module installed in a one of the plurality of component connectors;

detecting a failing but still operational first component module;

determining whether a second component module is installed in another one of the plurality of component connectors and is available to replace the failing first component module;

if the second component module is installed and available in the another one of the plurality of component connectors, then connecting the power source to the another one of the plurality of component connectors with some of the plurality of component power switches; and connecting the component bus to the another one of the plurality of component connectors with some of the plurality of component bus switches when the component bus is not active;

transferring information from the failing first component module to the second component module until all information has been transferred, said central processing unit performs this step by performing locked reads of portions of the contents of the failing first component module and then writes these portions to the second component module; and disconnecting the first component module from the component bus after the information has been transferred.

42. The method of claim 41, wherein the step of transferring information from the failing first component module to the second component module by the central processing unit is done in a background operation during normal operation of the computer system.

43. A method, in a computer system comprising a central processing unit, a component controller connected to the central processing unit, a component bus connected to the component controller, a plurality of component connectors adapted to receive component modules, a plurality of component bus switches connected between the component bus and the plurality of component connectors; a plurality of component power switches connected between the plurality of component connectors and a power source; and a logic circuit connected to the component bus, the plurality of component connectors, the plurality of component bus switches and the plurality of component power switches; said method comprising the steps of:

installing a new component module into a one of the plurality of component connectors;

determining when the new component module is installed;

waiting a predetermined time before connecting the new component module to the power source and then to the component bus;

initializing the new component module connected to the component bus for operation in the computer system, said central processing unit performs the initialization by- writing a predetermined bit pattern to all portions of the new component module;

notifying a computer system operating software of the new component module; and utilizing the new component module in the computer system.

44. The method of claim 43, wherein the step of initializing the new component module by the central processing unit is done in a background operation during normal operation of the computer system.

45. An apparatus, comprising:

a component controller adapted for connection to a central processing unit;

a component bus connected to said component controller;

a plurality of component connectors adapted to receive component modules;

a plurality of component bus switches connected between said component bus and said plurality of component connectors;

a plurality of component power switches connected between said plurality of component connectors and a power source;

a first component module installed in a one of said plurality of component connectors; and a logic circuit connected to said component bus, said plurality of component connectors, said plurality of component bus switches and said plurality of component power switches, wherein when said component controller determines that said first component module is failing but still operational, said component controller determines whether a second component module is installed in another one of said plurality of component connectors;

if said second component module is not installed then said component controller continues determining until said second component module is installed;

if said second component module is installed then said component controller transfers information stored in said first component module to said second component module until all information is transferred;

said logic circuit causing some of said plurality of component bus switches to disconnect said first component module from said component bus after all of the information is transferred; and said logic circuit causing some of said plurality of component power switches to disconnect said first component module from said power source after the some of said plurality of component bus switches has disconnected said first component module from said component bus.

46. An apparatus, comprising:

a component controller adapted for connection to a central processing unit;

a component bus connected to said component controller;

a plurality of component connectors adapted to receive component modules;

a plurality of component bus switches connected between said component bus and said plurality of component connectors;

a plurality of component power switches connected between said plurality of component connectors and a power source;

a new component module installed in a one of said plurality of component connectors; and a logic circuit connected to said component bus, said plurality of component connectors, said plurality of component bus switches and said plurality of component power switches, wherein when said logic circuit determines that said new component module is installed in the one of said plurality of component connectors, said logic circuit causes some of said plurality of power switches to connect the one of said plurality of component connectors to said power source, and then said logic circuit causes some of said component bus switches to connect the one of said plurality of component connectors to said component bus when said component bus is inactive;

said component controller initializing said new component module after the one of said plurality of component connectors is connected to said power source and said component bus; and said component controller notifies an operating system program of the availability of said new component module.

* * * * *